United States Patent
Yang et al.

(10) Patent No.: US 11,805,563 B2
(45) Date of Patent: Oct. 31, 2023

(54) WIRELESS COMMUNICATION METHOD AND BASE STATION

(71) Applicant: GUANGDONG OPPO MOBILE TELECOMMUNICATIONS CORP., LTD., Dongguan (CN)

(72) Inventors: Ning Yang, Dongguan (CN); Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 40 days.

(21) Appl. No.: 17/209,027

(22) Filed: Mar. 22, 2021

(65) Prior Publication Data
US 2021/0212144 A1 Jul. 8, 2021

Related U.S. Application Data

(63) Continuation of application No. PCT/CN2018/107733, filed on Sep. 26, 2018.

(51) Int. Cl.
*H04W 76/15* (2018.01)
*H04W 8/22* (2009.01)
*H04W 72/12* (2023.01)

(52) U.S. Cl.
CPC .......... *H04W 76/15* (2018.02); *H04W 8/22* (2013.01); *H04W 72/12* (2013.01)

(58) Field of Classification Search
CPC ... H04W 76/15; H04W 8/22; H04W 72/1205; H04W 8/24; H04W 36/0033; H04W 36/0069; H04W 72/12
See application file for complete search history.

(56) References Cited

U.S. PATENT DOCUMENTS

| | | | |
|---|---|---|---|
| 2015/0271726 A1* | 9/2015 | Kim | H04W 76/15 370/329 |
| 2018/0084539 A1* | 3/2018 | Kubota | H04W 76/20 |
| 2018/0255488 A1 | 9/2018 | Kim et al. | |
| 2018/0302827 A1* | 10/2018 | Mitsui | H04W 76/15 |
| 2019/0053292 A1* | 2/2019 | Ali | H04L 5/0055 |
| 2019/0068333 A1* | 2/2019 | Luo | H04L 1/1812 |

(Continued)

FOREIGN PATENT DOCUMENTS

| | | |
|---|---|---|
| CN | 103327630 A | 9/2013 |
| CN | 107666727 A | 2/2018 |

(Continued)

OTHER PUBLICATIONS

Guangdong OPPO Mobile Telecommunications Corp., Ltd., Examination Report, IN202127017240, dated Feb. 8, 2022, 6 pgs.

(Continued)

*Primary Examiner* — Mazda Sabouri
(74) *Attorney, Agent, or Firm* — Morgan, Lewis & Bockius LLP

(57) ABSTRACT

Embodiments of the present disclosure provide a wireless communication method and a base station. The method comprises: sending, by a first base station, a first message to a second base station, the first message including capability information of a terminal device, wherein the first message is sent when the first base station and the second base station establish a simultaneous connection to the terminal device.

17 Claims, 4 Drawing Sheets

(56) References Cited

U.S. PATENT DOCUMENTS

2020/0037387 A1* 1/2020 Lee .................. H04W 36/0069
2020/0154499 A1* 5/2020 Futaki .................. H04W 76/15
2022/0046737 A1* 2/2022 Yang .................... H04W 76/16

FOREIGN PATENT DOCUMENTS

| CN | 107820727 A | 3/2018 |
| KR | 20140118681 A | 10/2014 |
| WO | WO2020/061851 A1 | 4/2020 |

OTHER PUBLICATIONS

Guangdong OPPO Mobile Telecommunications Corp., Ltd., Extended European Search Report, EP18934761.0, dated Aug. 30, 2021, 8 pgs.
ZTE Corporation, "Introduction of Mobility Enhancement Solutions in RRC," 3GPP TSG-RAN2 Meeting #97, R2-1702394, Athens, Greece, Feb. 13-17, 2017, 52 pgs.
Ericsson ST-Ericsson, Overall procedures for offloading over Xn, 3GPP TSG-RAN WG2 Meeting #83, R2-132715, Barcelona, Spain, Aug. 19-23, 2013, 9 pgs.
Guangdong OPPO Mobile Telecommunications Corp., Ltd., International Search Report and Written Opinion, PCT/CN2018/107733, dated Jun. 25, 2019, 11 pgs.
Guangdong OPPO Mobile Telecommunications Corp., Ltd., EP18934761.0, First Office Action, dated Jun. 22, 2023, 5 pgs.

* cited by examiner

WIRELESS COMMUNICATION METHOD AND BASE STATION

CROSS-REFERENCE TO RELATED APPLICATIONS

The present application is a continuation of International Application No. PCT/CN2018/107733, entitled "WIRELESS COMMUNICATION METHOD AND BASE STATION" filed on Sep. 26, 2018, the entire disclosure of which is hereby incorporated by reference.

TECHNICAL FIELD

The present disclosure relates to the field of communication, and in particular, to a wireless communication method and a base station.

BACKGROUND

In a New Radio (NR) system, a terminal device can maintain connection with at least two base stations simultaneously.

How to implement communication in this connection mode is an urgent problem to be solved.

SUMMARY

A first aspect provides a wireless communication method, the method including: sending, by a first base station, a first message to a second base station, the first message including capability information of a terminal device; wherein the first message is sent when the first base station and the second base station establish a simultaneous connection to the terminal device.

A second aspect provides a wireless communication method, including: receiving, by a second base station, a first message sent by a first base station, the first message including capability information of a terminal device; wherein the first message is sent when the first base station and the second base station establish a simultaneous connection to the terminal device.

A third aspect provides a base station, configured to execute the method described in the first aspect or the second aspect. Specifically, the terminal device includes a functional module configured to execute the method described in the first aspect or the second aspect.

A fourth aspect provides a base station, including a processor and a memory. The memory is configured to store a computer program, and the processor is configured to call and run the computer program stored in the memory to execute the method described in the first aspect or the second aspect.

A fifth aspect provides a chip, configured to implement the method in the first aspect. Specifically, the chip includes a processor, configured to call and run a computer program from a memory, so that a device installed with the chip executes the method described in the first aspect or the second aspect.

A sixth aspect provides a computer-readable storage medium, configured to store a computer program that causes a computer to perform the method described in the first aspect or the second aspect.

A seventh aspect provides a computer program product, including computer program instructions, which cause the computer to perform the method described in the first aspect or the second aspect.

An eighth aspect provides a computer program which, when run on a computer, causes the computer to perform the method described in the first aspect or the second aspect.

DETAILED DESCRIPTION

The technical solutions in the embodiments of the present disclosure will be described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

The technical solutions according to the embodiments of the present disclosure may be applied to a variety of communications systems, such as a Global System for Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communications system, a future 5G system, or the like.

Figure 1:
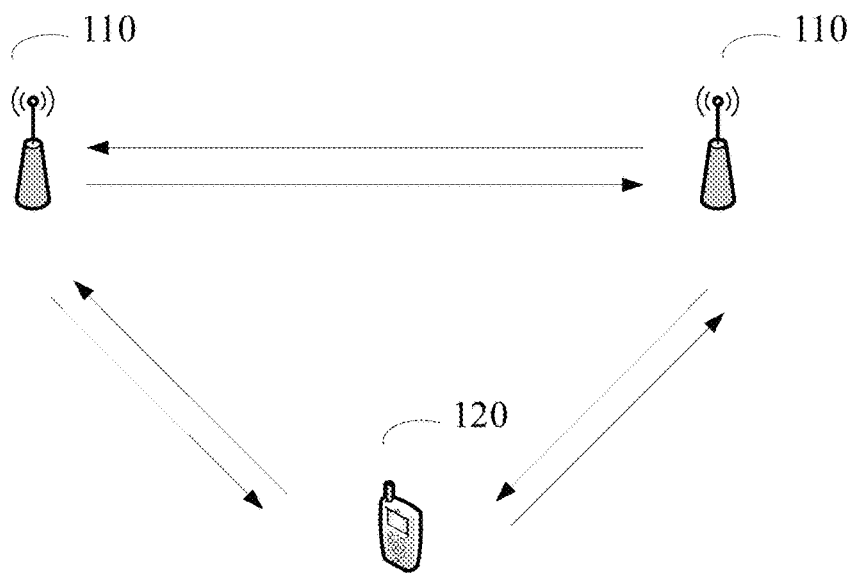
FIG. 1 is a schematic diagram of a communication system architecture provided by an embodiment of the present disclosure.

Exemplarily, a communication system 100 applied in an embodiment of the present disclosure is shown in FIG. 1. The communication system 100 may include a base station 110. The base station 110 may communicate with a terminal device 120 (or referred to as a communication terminal or a terminal). The base station 110 may provide communication coverage to a specific geographic region, and may communicate with a terminal device located within the coverage region. In some embodiments, the base station 110 may be a base transceiver station (BTS) in a global system for mobile communications (GSM) or a code division multiple access (CDMA) system, or a NodeB (NB) in a wideband code division multiple access (WCDMA) system, or an evolutional Node B (eNB or eNodeB) in a long term evolution (LTE) system, or a radio controller in a cloud radio access network (CRAN). Or, the base station may be a mobile switching center, a relay station, an access point, a vehicle device, a wearable device, a concentrator, a switchboard, a network bridge, a router, a access network device in a 5th generation (5G) network, or a access network device in a public land mobile network (PLMN) that will be evolved in the future, and the like. Communication between multiple base stations 110 is possible.

The communication system 100 further includes at least one terminal device 120 located within a coverage range of the base station 110. The "terminal device" used herein includes, but not limited to, connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network and an AM-FM broadcast transmitter; and/or an apparatus of another terminal device, which is configured to receive/transmit a communication signal; and/or an Internet of things (IoT) device. The terminal device configured to realize communication through a wireless interface may be referred to as a "wireless communication terminal", a "wireless terminal", or a "mobile terminal". Examples of the mobile terminal include, but not limited to, a satellite or cellular phone, and a personal communications system (PCS) terminal that may combine a cellular radiotelephone with data processing, facsimile, and data communication capabilities; a PDA which may include a radiotelephone, a pager, an Internet/intranet access, a Web browser, a notepad, a calendar, and/or a global positioning system (GPS) receiver; and a conventional laptop and/or palmtop receiver or other electronic apparatuses including radiotelephone transceivers. The terminal device may refer to an access terminal, user equipment (UE), a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device or other processing devices connected to a radio modem, a vehicle device, a wearable device, a terminal device in a 5G network, or a terminal device in the PLMN that will be evolved in the future, and the like.

FIG. 1 exemplarily illustrates two base stations and one terminal device. In some embodiments, the communication system 100 may include other numbers of base stations and other numbers of terminal devices, which is not limited by the embodiment of the present disclosure.

In some embodiments, the communication system 100 may also include other network entities such as a network controller and a mobile management entity, which is not limited by the embodiment of the present disclosure.

It should be understood that a device having a communication function in a network/system in the embodiment of the present disclosure may be referred to as a communication device. The communication system 100 shown in FIG. 1 is taken as an example. The communication device may include a base station 110 and a terminal device 120 which have communication functions. The base station 110 and the terminal device 120 may be the above-mentioned specific devices, and descriptions thereof are omitted here. The communication device may also include other devices in the communication system 100, such as other network entities including the network controller, the mobile management entity, and the like, which is not limited by the embodiment of the present disclosure.

Figure 2:
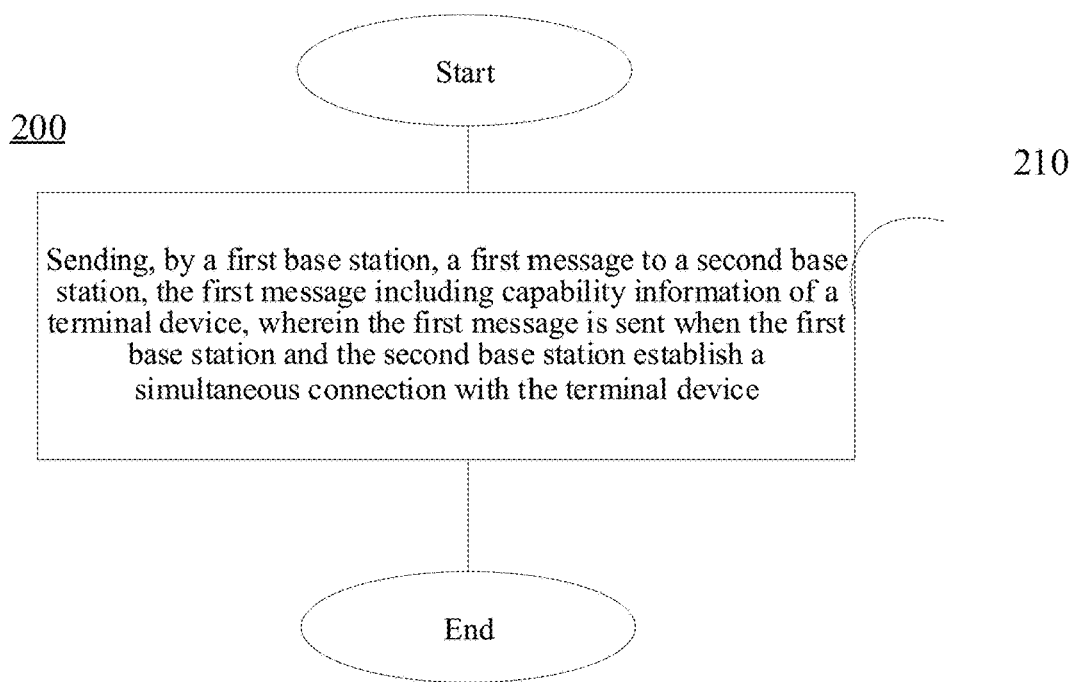
FIG. 2 is a schematic flowchart of a wireless communication method provided by an embodiment of the present disclosure.

FIG. 2 is a schematic flowchart of a wireless communication method 200 according to an embodiment of the present disclosure. The method 200 includes at least part of the following content.

In 210, a first base station sends a first message to a second base station, and the first message includes capability information of a terminal device; the first message is sent when the first base station and the second base station establish a simultaneous connection to the terminal device.

Figure 3:
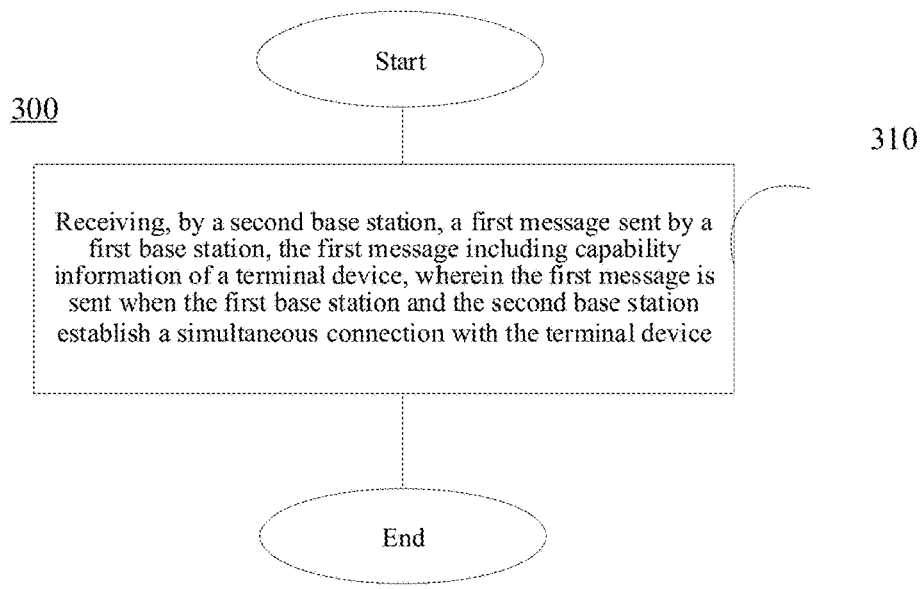
FIG. 3 is a schematic flowchart of a wireless communication method provided by an embodiment of the present disclosure.

FIG. 3 is a schematic flowchart of a wireless communication method 300 according to an embodiment of the present disclosure. The method 200 includes at least part of the following content.

In 310, a second base station receives a first message sent by a first base station, and the first message includes capability information of a terminal device; the first message is sent when the first base station and the second base station establish a simultaneous connection to the terminal device.

In some embodiments, after obtaining the capability information of the terminal device from the first message, the second base station may use the capability information of the terminal device to communicate with the terminal device, or may also perform other operations, for example, notifying the capability information of the terminal device to other devices or the like.

Therefore, in the embodiments of the present disclosure, when the first base station and the second base station establish the simultaneous connection to the terminal device, the first base station sends the capability information of the terminal device to the second base station, so that communication can be achieved when the terminal device and at least two base stations are connected at the same time, a handover delay can be reduced, the capability information of the terminal device can be shared between the first base station and the second base station. In addition, the second base station can timely obtain the capability information of the terminal device since the capability information is sent when the simultaneous connection is established.

In some embodiments, in the embodiments of the present disclosure, before the first base station sends the first message to the second base station, the first base station obtains the capability information of the terminal device from the terminal device.

In some embodiments, the capability information of the terminal device in the embodiments of the present disclosure may include static capability information of the terminal device and/or dynamic capability information of the terminal device.

The static capability information may refer to capability information of the terminal device that will not change or will not change in a short time. The dynamic capability information may refer to capability information of the terminal device that will change or that will change in a short time.

In some embodiments, the static capability information of the terminal device includes: a radio access technology (RAT) supported by the terminal device; or includes: the radio access technology (RAT) supported by the terminal device and a function supported by the RAT. The function supported by the RAT may include: broadcast and multicast function, voice function (voice over LTE (VoLTE)/voice over NR (VoNR)), direct terminal connection function, and discontinuous reception (DRX) function, semi-persistent scheduling function, and the like. For example, the static capability information may be included in eutra-CapabilityInfo.

In some embodiments, the dynamic capability information of the terminal device includes at least one of:

a distribution of transmission power of the terminal device between the first base station and the second base station (for example, powerCoordinationInfo), a distribution of a buffer of the terminal device between the first base station and the second base station, a maximum transmission block size supported by the terminal device for the first base station and/or the second base station (for example, scg-ConfigRestrictInfo), a maximum frequency layer supported by the terminal device for the first base station and/or the second base station (for example, sCellToAddModList-SCG), a maximum number of subcarriers supported by the terminal device for the first base station and/or the second base station, and the number of secondary cells or secondary nodes that the terminal device can be added.

In some embodiments, in the embodiments of the present disclosure, the simultaneous connection of the first base station and the second base station with the terminal device refers to that the terminal device simultaneously maintains a connection with the first base station and a connection with the second base station.

The connection between the terminal device and the first base station may be a user plane connection and/or a control plane connection. And the connection between the terminal device and the second base station may be a user plane connection and/or a control plane connection.

For example, the connection between the terminal device and the first base station may be the user plane connection and the control plane connection, and the connection between the terminal device and the second base station may be the user plane connection.

For example, the connection between the terminal device and the first base station may be the user plane connection and the control plane connection, and the connection between the terminal device and the second base station may be the control plane connection.

For example, the connection between the terminal device and the first base station may be the user plane connection and the control plane connection, and the connection between the terminal device and the second base station may be the user plane connection and the control plane connection.

For example, the connection between the terminal device and the first base station may be the user plane connection, and the connection between the terminal device and the second base station may be the control plane connection.

For example, the connection between the terminal device and the first base station may be the control plane connection, and the connection between the terminal device and the second base station may be the user plane connection.

For example, the connection between the terminal device and the first base station may be the user plane connection, and the connection between the terminal device and the second base station may be the user plane connection and the control plane connection.

For example, the connection between the terminal device and the first base station may be the control plane connection, and the connection between the terminal device and the second base station may be the user plane connection and the control plane connection.

In some embodiments, in the embodiments of the present disclosure, the first message being sent when the first base station and the second base station establish the simultaneous connection to the terminal device may refer to that the first message is a first message, a last message or any of middle messages when the simultaneous connection is established, and the first message may be sent during the establishment of the simultaneous connection.

In some embodiments, in the embodiments of the present disclosure, that the first base station and the second base station establish the simultaneous connection to the terminal device may mean that: a connection with one base station can be established first, and then a connection with another base station can be established, and at this time, the connection between the one terminal device and the base station is not released. The first message may be sent in the process of establishing the connection between the terminal device and the another base station.

Of course, the respective connections between the first base station and the second base station and the terminal device may be established at the same time, which is not specifically limited in the embodiment of the present disclosure.

In order to facilitate a clearer understanding of the present disclosure, the following description will be made in combination with the two scenarios shown in FIGS. 4 and 5.

In one scenario, the first message is a handover request message.

Specifically, the simultaneous connection between the first base station and the second base station and the terminal device can be established through a handover process. In this case, the first base station may first establish a connection with the terminal device, and then a cell handover process is executed, and a connection between the second base station and the terminal device is established through the cell handover process, and at this time, the connection between the first base station and the terminal device is not released. The cell handover process can be referred to as a process for the first base station and the second base station to establish the simultaneous connection to the terminal device. The first message may be the handover request message.

Figure 4:
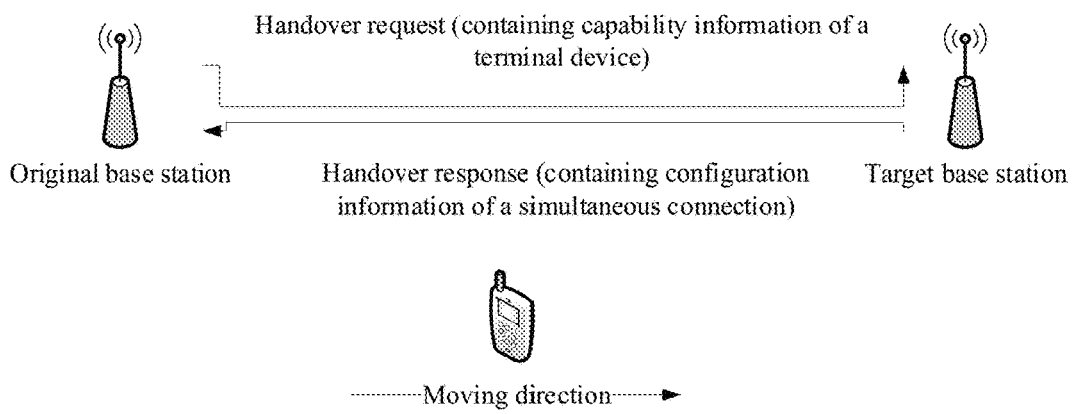
FIG. 4 is a schematic diagram of a wireless communication method provided by an embodiment of the present disclosure.

For example, as shown in FIG. 4, an original base station can send a handover request message to a target base station. The handover request message can carry the capability information of the terminal device. Of course, the first message can also be other messages in the cell handover process, which is not limited by the embodiments of the present disclosure.

In another scenario, the first message is a secondary node (SN) addition request message or a secondary cell (SCell) addition request message.

Specifically, another base station can be requested to be added as a serving base station (SN or SCell) of the terminal device through the SN addition request message or the SCell addition request message. In this case, the first base station may first establish a connection with the terminal device, and the SN or SCell can be added through the SN or SCell addition process. Specifically, a connection between the second base station and the terminal device can be established through the SN addition request message or the SCell addition request message without releasing the connection between the first base station and the terminal device. The SN or SCell addition process can be referred to as a process for the first base station and the second base station to establish the simultaneous connection to the terminal device. The first message can be the SN addition request message or the SCell addition request message, or can be other messages in the SN or SCell addition process.

Figure 5:
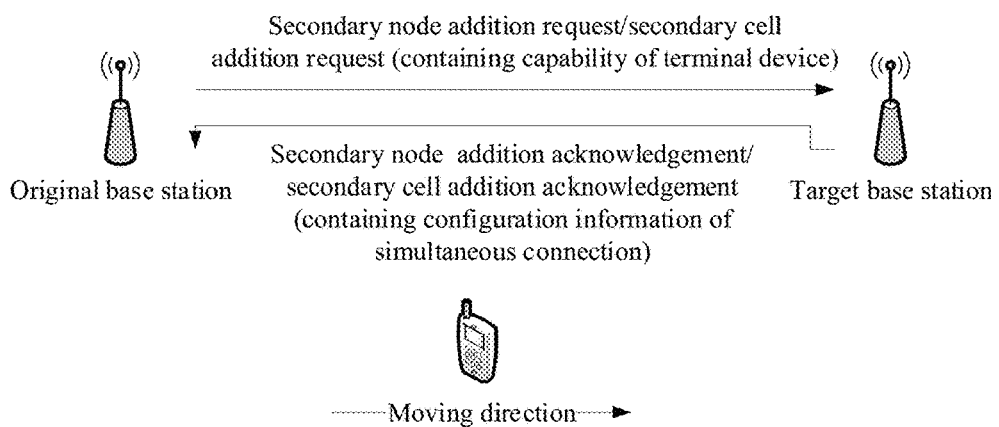
FIG. 5 is a schematic diagram of a wireless communication method provided by an embodiment of the present disclosure.

For example, as shown in FIG. 5, the capability information of the terminal device may be carried in the SN addition request message or SCell addition request message sent by the original base station.

After the first base station sends the SN addition request message or the SCell addition request message to the second base station, the handover process between the first base station and the second base station may be executed. For example, as shown in FIG. 4, the handover process between the original base station and the target base station is performed. At this time, the original base station can become an SN, and the target base station can become a master node (MN).

It should be understood that in this other scenario, the handover may not be performed, which is not specifically limited in the embodiment of the present disclosure.

In some embodiments, in the embodiments of the present disclosure, after the second base station receives the first message sent by the first base station, the second base station may send a second message to the first base station, and the second message is a response message to the first message, and the first base station receives the second message sent by the second base station.

For example, as shown in FIG. 4, the second message may be a handover response message. For example, as shown in FIG. 5, the second message may be a SN addition response message or a SCell response request message.

The second message may carry configuration information for the terminal device to simultaneously connect to the first base station and the second base station.

Therefore, in the embodiments of the present disclosure, when the first base station and the second base station establish the simultaneous connection to the terminal device, the first base station sends the capability information of the terminal device to the second base station, so that communication can be achieved when the terminal device and at least two base stations are connected at the same time, a handover delay can be reduced, the capability information of the terminal device can be shared between the first base station and the second base station. In addition, the second base station can timely obtain the capability information of the terminal device since the capability information is sent when the simultaneous connection is established.

Figure 6:
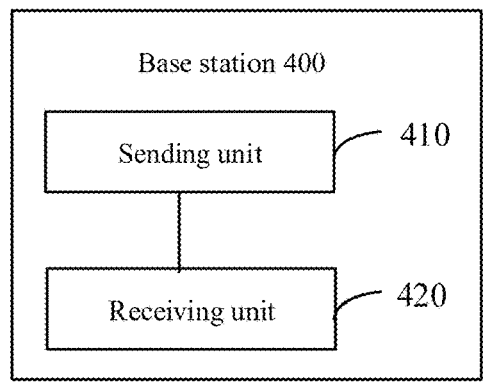
FIG. 6 is a schematic block diagram of a base station provided by an embodiment of the present disclosure.

FIG. 6 is a schematic block diagram of a base station 400 according to an embodiment of the present disclosure. The base station 400 is a first base station. As shown in FIG. 6, the base station 400 includes:
 a sending unit 410, configured to send a first message to a second base station, the first message including capability information of a terminal device;
 the first message is sent when the first base station and the second base station establish a simultaneous connection to the terminal device.

In some embodiments, in an embodiment of the present disclosure, the first message is a handover request message.

In some embodiments, in an embodiment of the present disclosure, the first message is a secondary node (SN) addition request message or a secondary cell (SCell) addition request message.

In some embodiments, in an embodiment of the present disclosure, the capability information of the terminal device includes static capability information of the terminal device and/or dynamic capability information of the terminal device.

In some embodiments, in an embodiment of the present disclosure, the static capability information of the terminal device includes: a radio access technology (RAT) supported by the terminal device; or includes: the radio access technology (RAT) supported by the terminal device and a function supported by the RAT.

In some embodiments, in an embodiment of the present disclosure, the dynamic capability information of the terminal device includes at least one of:
 a distribution of transmission power of the terminal device between the first base station and the second base station, a distribution of a buffer of the terminal device between the first base station and the second base station, a maximum transmission block size supported by the terminal device for the first base station and/or the second base station, a maximum frequency layer supported by the terminal device for the first base station and/or the second base station, a maximum number of subcarriers supported by the terminal device for the first base station and/or the second base station, and the number of secondary cells or secondary nodes that the terminal device can be added.

In some embodiments, in an embodiment of the present disclosure, as shown in FIG. 6, the base station 400 further includes a receiving unit 420, configured to:
 receive a second message sent by the second base station, and the second message is a response message to the first message.

In some embodiments, in an embodiment of the present disclosure, the second message carries configuration information for the terminal device to simultaneously connect to the first base station and the second base station.

In some embodiments, in an embodiment of the present disclosure, as shown in FIG. 6, the base station 400 further includes a receiving unit 420, configured to:
 obtain the capability information of the terminal device from the terminal device.

In some embodiments, in an embodiment of the present disclosure, there is a user plane connection and a control plane connection between the first base station and the terminal device, and there is a user plane connection and a control plane connection between the second base station and the terminal device.

It should be understood that the base station 400 may correspond to the first base station in the foregoing method embodiments, and may implement the functions of the first base station. For brevity, details thereof are not described herein again.

Figure 7:
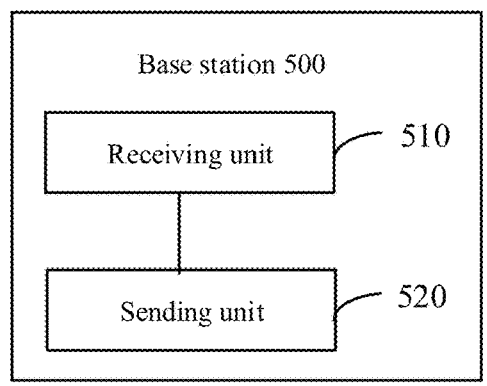
FIG. 7 is a schematic block diagram of a base station provided by an embodiment of the present disclosure.

FIG. 7 is a schematic block diagram of a base station 500 according to an embodiment of the present disclosure. The base station 500 is a second base station, and the base station 500 includes a receiving unit 510, configured to:
 receive a first message sent by a first base station, the first message including capability information of a terminal device;
 the first message is sent when the first base station and the second base station establish a simultaneous connection to the terminal device.

In some embodiments, in an embodiment of the present disclosure, the first message is a handover request message.

In some embodiments, in an embodiment of the present disclosure, the first message is a secondary node (SN) addition request message or a secondary cell (SCell) addition request message.

In some embodiments, in an embodiment of the present disclosure, the capability information of the terminal device includes static capability information of the terminal device and/or dynamic capability information of the terminal device.

In some embodiments, in an embodiment of the present disclosure, the static capability information of the terminal device includes: a radio access technology (RAT) supported by the terminal device; or includes: the radio access technology (RAT) supported by the terminal device and a function supported by the RAT.

In some embodiments, in an embodiment of the present disclosure, the dynamic capability information of the terminal device includes at least one of:
 a distribution of transmission power of the terminal device between the first base station and the second base station, a distribution of a buffer of the terminal device between the first base station and the second base station, a maximum transmission block size supported by the terminal device for the first base station and/or the second base station, a maximum frequency layer supported by the terminal device for the first base station and/or the second base station, a maximum number of subcarriers supported by the terminal device for the first base station and/or the second base station, and the number of secondary cells or secondary nodes that the terminal device can be added.

In some embodiments, in an embodiment of the present disclosure, as shown in FIG. 7, the base station 500 further includes a sending unit 520, configured to:
 send a second message to the first base station, and the second message is a response message to the first message.

In some embodiments, in an embodiment of the present disclosure, the second message carries configuration information for the terminal device to simultaneously connect to the first base station and the second base station.

In some embodiments, in an embodiment of the present disclosure, as shown in FIG. 7, the base station 500 further includes a sending unit 520, configured to:
 communicate with the terminal device by using the capability information of the terminal device.

In some embodiments, in an embodiment of the present disclosure, there is a user plane connection and a control plane connection between the first base station and the terminal device, and there is a user plane connection and a control plane connection between the second base station and the terminal device.

It should be understood that the base station 500 may correspond to the second base station in the foregoing method embodiments, and may implement the functions of the second base station. For brevity, details thereof are not described herein again.

Figure 8:
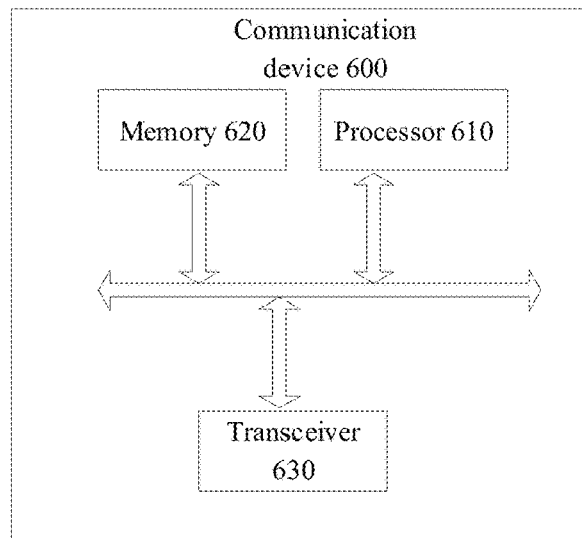
FIG. 8 is a schematic block diagram of a communication device provided by an embodiment of the present disclosure.

FIG. 8 is a schematic block diagram of a terminal 600 according to an embodiment of the present disclosure. The terminal device 600 shown in FIG. 8 includes a processor 610. The processor 610 may invoke a computer program from a memory and run the computer program, to implement the method in the embodiments of the present disclosure.

In some embodiments, as shown in FIG. 8, the terminal device 600 may further include a memory 620. The processor 610 may invoke the computer program from the memory 620 and run the computer program, to implement the method in the embodiments of the present disclosure.

The memory 620 may be a component independent of the processor 610, or may be integrated into the processor 610.

In some embodiments, as shown in FIG. 8, the terminal device 600 may further include a transceiver 630. The processor 610 may control the transceiver 630 to communicate with another device, and specifically, the transceiver 630 may transmit information or data to another device, or receive information or data transmitted by another device.

The transceiver 630 may include a transmitter and a receiver. The transceiver 630 may further include an antenna. There may be one or more antennas.

In some embodiments, the communication device 600 may be a base station, and the communication device 600 may implement corresponding procedures implemented by the first base station or the second base station in the method embodiments of the present disclosure. For brevity, details thereof are not described herein again.

Figure 9:
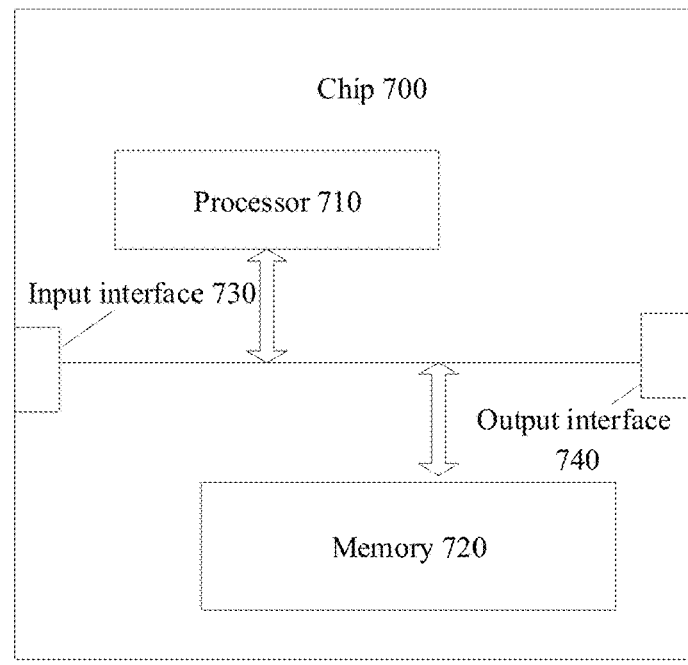
FIG. 9 is a schematic block diagram of a chip provided by an embodiment of the present disclosure.

FIG. 9 is a schematic block diagram of a chip 700 according to an embodiment of the present disclosure. The chip 700 shown in FIG. 9 includes a processor 710, and the processor 710 can call and run a computer program from a memory to implement the method in the embodiments of the present disclosure.

In some embodiments, as shown in FIG. 9, the chip 700 may further include a memory 720. The processor 710 may call and run a computer program from the memory 720 to implement the method in the embodiments of the present disclosure.

The memory 720 may be a component independent of the processor 710, or may be integrated into the processor 710.

In some embodiments, the chip 700 may further include an input interface 730. The processor 710 may control the input interface 730 to communicate with another device or chip, and specifically, the input interface 730 may obtain information or data transmitted by another device or chip.

In some embodiments, the chip 700 may further include an output interface 740. The processor 710 may control the output interface 740 to communicate with another device or chip, and specifically, the output interface 740 may output information or data to another device or chip In some embodiments, the chip can be applied to the terminal device in the embodiments of the present disclosure, and the chip can implement corresponding procedures implemented by the terminal device in various methods in the embodiments of the present disclosure. For brevity, details thereof are not described herein again.

In some embodiments, the chip can be applied to the base station in the embodiments of the present disclosure, and the chip can implement corresponding procedures implemented by the first base station or the second base station in various methods in the embodiments of the present disclosure. For brevity, details thereof are not described herein again.

It should be noted that, the chip mentioned in the embodiments of the present disclosure may also be referred to as a system-level chip, a system chip, a chip system, a system on chip, or the like.

Figure 10:
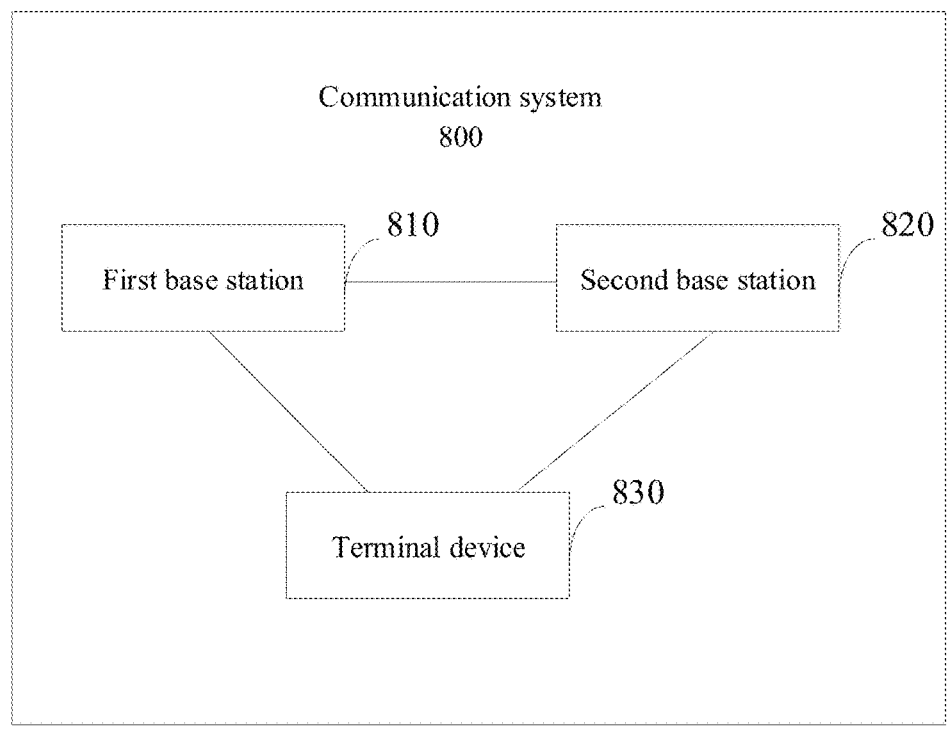
FIG. 10 is a schematic block diagram of a communication system provided by an embodiment of the present disclosure.

FIG. 10 is a schematic block diagram of a communication system 800 provided by an embodiment of the present disclosure. As shown in FIG. 10, the communication system 800 includes a first base station 810, a second base station 820, and a terminal device 830.

The first base station 810 may be configured to implement corresponding functions implemented by the first base station in the foregoing method, the second base station 820 may be configured to implement corresponding functions implemented by the second base station in the foregoing method, and the terminal device 830 may be configured to implement corresponding functions implemented by the terminal device in the foregoing method. For brevity, details thereof are not described here.

The foregoing processor may be a general purpose processor, a digital signal processor (DSP), a field programmable gate array (FPGA), an application specific integrated circuit (ASIC) or another programmable logic device, a transistor logic device, a discrete hardware component or the like. The foregoing general purpose processor may be a microprocessor, or may be any conventional processor, or the like.

The above-mentioned memory may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM).

It should be understood that, the memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct Rambus RAM (DR RAM), and the like. That is, the memory described in the embodiments of the present disclosure is intended to include but is not limited to these memories and any other suitable type of memory.

A person of ordinary skill in the art may be aware that, in combination with the examples described in the embodiments disclosed in this specification, units and algorithm steps may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method embodiments, and details thereof are not described herein again.

In several embodiments provided in the present disclosure, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, that is, may be located in one position, or may be distributed on multiple network units. Some of or all of the units may be selected according to actual needs to achieve the objectives of the solutions of the embodiments.

In addition, the functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is the claimed is:

1. A wireless communication method, comprising:
   sending, by a first base station, a first message to a second base station, the first message comprising capability information of a terminal device;
   wherein the first message is sent when the first base station and the second base station establish a simultaneous connection to the terminal device,
   wherein the capability information of the terminal device comprises dynamic capability information of the terminal device, and
   wherein the dynamic capability information of the terminal device comprises:
   a distribution of transmission power of the terminal device between the first base station and the second base station, a distribution of a buffer of the terminal device between the first base station and the second base station, a maximum frequency layer supported by the terminal device for the first base station and/or the second base station, and a maximum number of subcarriers supported by the terminal device for the first base station and/or the second base station,
   wherein the first message is a handover request message.

2. The method according to claim 1, wherein the capability information of the terminal device further comprises static capability information of the terminal device, and the static capability information of the terminal device comprises: a radio access technology (RAT) supported by the terminal device; or comprises: the radio access technology (RAT) supported by the terminal device and a function supported by the RAT.

3. The method according to claim 1, wherein the method further comprises:
   receiving, by the first base station, a second message sent by the second base station, wherein the second message is a response message to the first message, and
   wherein the second message is a handover response message and carries configuration information for the terminal device to simultaneously connect to the first base station and the second base station.

4. The method according to claim 1, wherein before sending, by the first base station, the first message to the second base station, the method further comprises:
obtaining, by the first base station, the capability information of the terminal device from the terminal device.

5. The method according to claim 1, wherein there is a user plane connection and a control plane connection between the first base station and the terminal device, and there is a user plane connection and a control plane connection between the second base station and the terminal device.

6. A wireless communication method, comprising:
receiving, by a second base station, a first message sent by a first base station, the first message comprising capability information of a terminal device;
wherein the first message is sent when the first base station and the second base station establish a simultaneous connection to the terminal device,
wherein the capability information of the terminal device comprises dynamic capability information of the terminal device, and
wherein the dynamic capability information of the terminal device comprises:
a distribution of transmission power of the terminal device between the first base station and the second base station, a distribution of a buffer of the terminal device between the first base station and the second base station, a maximum frequency layer supported by the terminal device for the first base station and/or the second base station, and a maximum number of subcarriers supported by the terminal device for the first base station and/or the second base station,
wherein the first message is a handover request message.

7. The method according to claim 6, wherein the capability information of the terminal device further comprises static capability information of the terminal device, and the static capability information of the terminal device comprises: a radio access technology (RAT) supported by the terminal device; or comprises: the radio access technology (RAT) supported by the terminal device and a function supported by the RAT.

8. The method according to claim 6, wherein the method further comprises:
sending, by the second base station, a second message to the first base station, wherein the second message is a response message to the first message,
wherein the second message is a handover response message and carries configuration information for the terminal device to simultaneously connect to the first base station and the second base station.

9. The method according to claim 6, wherein the method further comprises:
communicating, by the second base station, with the terminal device by using the capability information of the terminal device.

10. The method according to claim 6, wherein there is a user plane connection and a control plane connection between the first base station and the terminal device, and there is a user plane connection and a control plane connection between the second base station and the terminal device.

11. A base station, comprising a processor and a memory, the memory is configured to store a computer program, and the processor is configured to call and run the computer program stored in the memory to execute a wireless communication method comprising:

sending a first message to a second base station or receiving the first message from a first base station, the first message comprising capability information of a terminal device;
wherein the first message is sent when the first base station and the second base station establish a simultaneous connection to the terminal device,
wherein the capability information of the terminal device comprises dynamic capability information of the terminal device, and
wherein the dynamic capability information of the terminal device comprises:
a distribution of transmission power of the terminal device between the first base station and the second base station, a distribution of a buffer of the terminal device between the first base station and the second base station, a maximum frequency layer supported by the terminal device for the first base station and/or the second base station, and a maximum number of subcarriers supported by the terminal device for the first base station and/or the second base station,
wherein the first message is a handover request message.

12. The base station according to claim 11, wherein the capability information of the terminal device further comprises static capability information of the terminal device, and the static capability information of the terminal device comprises: a radio access technology (RAT) supported by the terminal device; or comprises: the radio access technology (RAT) supported by the terminal device and a function supported by the RAT.

13. The base station according to claim 11, wherein the wireless communication method further comprises:
receiving or sending a second message from the second base station or to the first base station, wherein the second message is a response message to the first message,
wherein the second message is a handover response message and carries configuration information for the terminal device to simultaneously connect to the first base station and the second base station.

14. The base station according to claim 11, wherein the wireless communication method further comprises:
obtaining, the first base station, the capability information of the terminal device from the terminal device.

15. The method according to claim 1, wherein the dynamic capability information of the terminal device further comprises at least one of a maximum transmission block size supported by the terminal device for the first base station and/or the second base station and a number of secondary cells or secondary nodes that the terminal device can be added.

16. The method according to claim 6, wherein the dynamic capability information of the terminal device further comprises at least one of a maximum transmission block size supported by the terminal device for the first base station and/or the second base station and a number of secondary cells or secondary nodes that the terminal device can be added.

17. The base station according to claim 11, wherein the dynamic capability information of the terminal device further comprises at least one of a maximum transmission block size supported by the terminal device for the first base station and/or the second base station and a number of secondary cells or secondary nodes that the terminal device can be added.

* * * * *